United States Patent
Kwon et al.

(10) Patent No.: US 7,886,142 B2
(45) Date of Patent: Feb. 8, 2011

(54) APPARATUS AND METHOD FOR SCRAMBLING A PACKET DATA CHANNEL AND A PACKET DATA CONTROL CHANNEL IN A MOBILE COMMUNICATION SYSTEM FOR HIGH-SPEED PACKET TRANSMISSION

(75) Inventors: Hwan-Joon Kwon, Seoul (KR); Ho-Kyu Choi, Songnam-shi (KR); Young-Kwon Cho, Suwon-shi (KR); Chang-Hun Bae, Seoul (KR); Woo-Sang Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1817 days.

(21) Appl. No.: 10/100,873

(22) Filed: Mar. 19, 2002

(65) Prior Publication Data

US 2002/0138721 A1    Sep. 26, 2002

(30) Foreign Application Priority Data

Mar. 20, 2001   (KR) ............. 10-2001-0014435

(51) Int. Cl.
*H04L 9/00*   (2006.01)
(52) U.S. Cl. .................. 713/151; 380/26; 380/268; 726/2
(58) Field of Classification Search ............ 713/151, 713/200, 201, 1, 2, 188, 194; 380/255, 277, 380/200, 201, 26, 268; 726/2; 375/220
See application file for complete search history.

(56) References Cited

U.S. PATENT DOCUMENTS

| | | | | |
|---|---|---|---|---|
| 4,862,268 A * | 8/1989 | Campbell et al. ........... 348/463 |
| 5,659,569 A * | 8/1997 | Padovani et al. ........... 370/479 |
| 6,072,788 A * | 6/2000 | Peterson et al. ........... 370/337 |
| 6,393,008 B1 * | 5/2002 | Cheng et al. ............... 370/338 |
| 6,480,525 B1 * | 11/2002 | Parsa et al. ................ 375/141 |
| 6,567,390 B1 * | 5/2003 | Banister et al. ........... 370/342 |
| 6,643,318 B1 * | 11/2003 | Parsa et al. ................ 375/141 |
| 6,724,813 B1 * | 4/2004 | Jamal et al. ................ 375/219 |
| 7,120,134 B2 * | 10/2006 | Tiedemann et al. ........ 370/329 |
| 7,158,482 B2 * | 1/2007 | Love et al. ................. 370/252 |

FOREIGN PATENT DOCUMENTS

WO    PCT/US96/04915    *  4/1996

* cited by examiner

*Primary Examiner*—Kimyen Vu
*Assistant Examiner*—Joseph Pan
(74) *Attorney, Agent, or Firm*—The Farrell Law Firm, LLP

(57) ABSTRACT

A base station PDCCH (Packet Data Control Channel) apparatus for scrambling transmission packet data to prevent other terminals from recognizing the transmission packet data in a base station including a packet data channel device for transmitting packet data to a terminal and a packet data control channel device for transmitting control information needed for demodulation of the packet data to the terminal. In the apparatus, an encoder encodes the control information and generates a coded control information stream comprised of a stream of a plurality of bits. A scrambler generates a scrambling sequence using unique information known to only the terminal and the base station, and scrambles the coded control information stream with the scrambling sequence.

16 Claims, 10 Drawing Sheets

APPARATUS AND METHOD FOR SCRAMBLING A PACKET DATA CHANNEL AND A PACKET DATA CONTROL CHANNEL IN A MOBILE COMMUNICATION SYSTEM FOR HIGH-SPEED PACKET TRANSMISSION

PRIORITY

This application claims priority to an application entitled "Apparatus and Method for Scrambling Packet Data Channel and Packet Data Control Channel in a Mobile Communication System for High-Speed Packet Transmission" filed in the Korean Industrial Property Office on Mar. 20, 2001 and assigned Serial No. 2001-14435, the contents of which are hereby incorporated by reference.

BACKGROUND OF THE INVENTION

1. Field of the Invention

The present invention relates generally to a mobile communication system for high-speed packet transmission, and in particular, to an apparatus and method for scrambling a packet data channel and a packet data control channel before transmission. Further, the present invention relates to an apparatus and method for scrambling a packet data channel and a packet data control channel with a scrambling code generated using information other than control information transmitted over the packet data control channel.

2. Description of the Related Art

In general, a mobile communication system for high-speed packet transmission is divided into two systems; one system supporting only data transmission and another system supporting voice transmission as well as the data transmission. The mobile communication system for high-speed packet transmission is designed to use a high-speed packet data transmission channel for a high-speed data service. The high-speed packet data transmission channel is shared by a plurality of users (or terminals) on a time division multiplexing (TDM) basis in order to transmit data at high speed.

In the mobile communication system for high-speed packet transmission, a transmitter transmits various control information of data transmitted through the high-speed packet data transmission channel on a TDM basis, over a packet data control channel (PDCCH). The users should previously receive control information for the data containing information pertaining to a destination, a data length, a data rate and a modulation mode, among others, of the data transmitted at a specific point in time to be provided with a data service through the high-speed packet data transmission channel.

The control information for the packet data includes subpacket length information, MAC (Medium Access Control) ID, data rate, modulation mode, payload size, subpacket ID (SPID), and ARQ (Automatic Repeat Request) channel ID. In the mobile communication system for high-speed packet transmission, a transmission unit of the data transmitted through the high-speed packet data transmission channel is called a "subpacket", and the "subpacket length information" refers to a time length of the data transmitted over the high-speed packet data transmission channel on a TDM basis. A system supporting a variable data length must transmit this information to the users. The MAC ID, an identifier for user identification, is assigned to the user desiring to receive a high-speed packet data service during system access. The "data rate" means a transfer rate of data having the subpacket length, and the "modulation mode" indicates a selected one of QPSK (Quadrature Phase Shit Keying), 8PSK (8-ary Phase Shift Keying), 16QAM (16-ary Quadrature Amplitude Modulation) and 64QAM (64-ary QAM) modulations used to modulate the transmission data. The "payload size" refers to the number of information bits constituting one subpacket, and the subpacket ID (SPID), an identifier of each of the subpackets, is used to support retransmission. The ARQ channel ID, an identifier for supporting continuous data transmission to one user, is used in identifying a parallel transmission channel.

As described above, in the mobile communication system for high-speed packet transmission, the control information transmitted over the packet data control channel includes 2-bit subpacket length information, 6-bit MAC ID, 2-bit payload size, 2-bit SPID and 2-bit ARQ channel ID, and the data rate and the modulation mode are determined depending on the 2-bit subpacket, the 2-bit payload size and Walsh function information used for a packet data transmission channel transmitted through another channel. Thus, upon receiving a packet data control channel after being assigned MAC ID during system access, a terminal (or user) desiring to be provided with the high-speed packet data service demodulates the received packet data control channel and analyzes the MAC ID to determine whether the received packet is destined thereto. If so, the terminal demodulates the packet data channel using information on subpacket length, payload size, SPID and ARQ channel ID, acquired by demodulating the packet data control channel and information on a Walsh function used for the packet data channel. Here, information on a data rate and a modulation mode of the received subpacket is determined based on a combination of the subpacket length, the payload size and the Walsh function used for the packet data channel.

For example, the mobile communication system for high-speed packet transmission could transmit the packet data control information using two packet data control channels: a forward primary packet data control channel (PPDCCH) and a forward secondary packet data control channel (SPDCCH).

Meanwhile, the mobile communication system for high-speed packet transmission transmits user data through a structure of a forward packet data channel (F-PDCH), a high-speed packet data transmission channel, illustrated in FIG. 1. The mobile communication system scrambles coded symbols using a scrambler 102 in order to prevent other users from demodulating the user data.

Referring to FIG. 1, an encoder 101 encodes a stream of input information bits of a forward shared packet data channel and outputs coded symbols. A scrambling code generator 102 generates a scrambling code for scrambling packet data. An XOR operator 103 scrambles the coded symbols from the encoder 101 using the scrambling code. The scrambling code generator 102 and the XOR operator 103 constitute a scrambler. A channel interleaver 104 interleaves the scrambled coded symbols from the XOR operator 103 according to a predetermined interleaving rule. A puncturer 105 punctures an output of the channel interleaver 104 according to a given rule. A modulator 106 modulates an output of the puncturer 105 and outputs modulated symbols. A sequence repeater 107 repeats the modulated symbols from the modulator 106 a predetermined number of times. A symbol demultiplexer 108 demultiplexes the symbols output from the sequence repeater 107 according to the number of sub channels. A 32-chip Walsh cover section 109 spreads outputs of the symbol demultiplexer 108 with a Walsh code of length 32. A gain controller (or Walsh channel gain controller) 110 controls a gain of the outputs of the Walsh cover section 109. A Walsh chip level summer 111 sums up outputs of the gain controller 110 on a chip level.

Conventionally, the scrambling code generator 102 generates a scrambling code using the 6-bit MAC ID and the 4-bit data rate, and the XOR operator 103 XORs the coded symbols from the encoder 101 and the scrambling code. Therefore, a system whose users have no information about the MAC ID and the data rate can perform a data protection function. However, in the mobile communication system for high-speed packet transmission, all of the users can receive the PPDCCH and the SPDCCH, so one user may recognize the MAC ID and the data rate of other users. Thus, the data protection function is useless.

In addition, a base station transmits packet data control information over both the PPDCCH and the SPDCCH, and all of the terminals receive the PPDCCH and the SPDCCH, and demodulate them. That is, the packet data control information of a specific terminal is fully open to the other terminals undesirably.

SUMMARY OF THE INVENTION

It is, therefore, an object of the present invention to provide an apparatus and method for scrambling coded symbols of a packet data channel with a scrambling code generated using information known to only a specific user receiving the packet data.

It is another object of the present invention to provide an apparatus and method for scrambling coded symbols of a packet data control channel with a scrambling code generated using information known to only a specific user receiving the packet data.

To achieve the above and other objects, the invention provides a base station PDCCH apparatus for scrambling transmission packet data to prevent other terminals from recognizing the transmission packet data in a base station including a packet data channel device for transmitting packet data to a terminal and a packet data control channel device for transmitting control information needed for demodulation of the packet data to the terminal. In the apparatus, an encoder encodes the control information and generates a coded control information stream comprised of a stream of a plurality of bits. A scrambler generates a scrambling sequence using unique information known to only the terminal and the base station, and scrambles the coded control information stream with the scrambling sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the specifics such as a length and a number of the Walsh function used for spreading the forward packet data control channels (or preamble channels), the type of information and the number of information bits transmitted through the packet data control channels are provided by way of example for a better understanding of the present invention. It would be obvious to those skilled in the art that the invention may be implemented without the specifics contained in the examples, through modification thereof. In addition, the term "forward link" as used herein refers to a transmission link from a base station to a terminal (or mobile station), while the term "reverse link" refers to a transmission link from the terminal to the base station.

Figure 1:
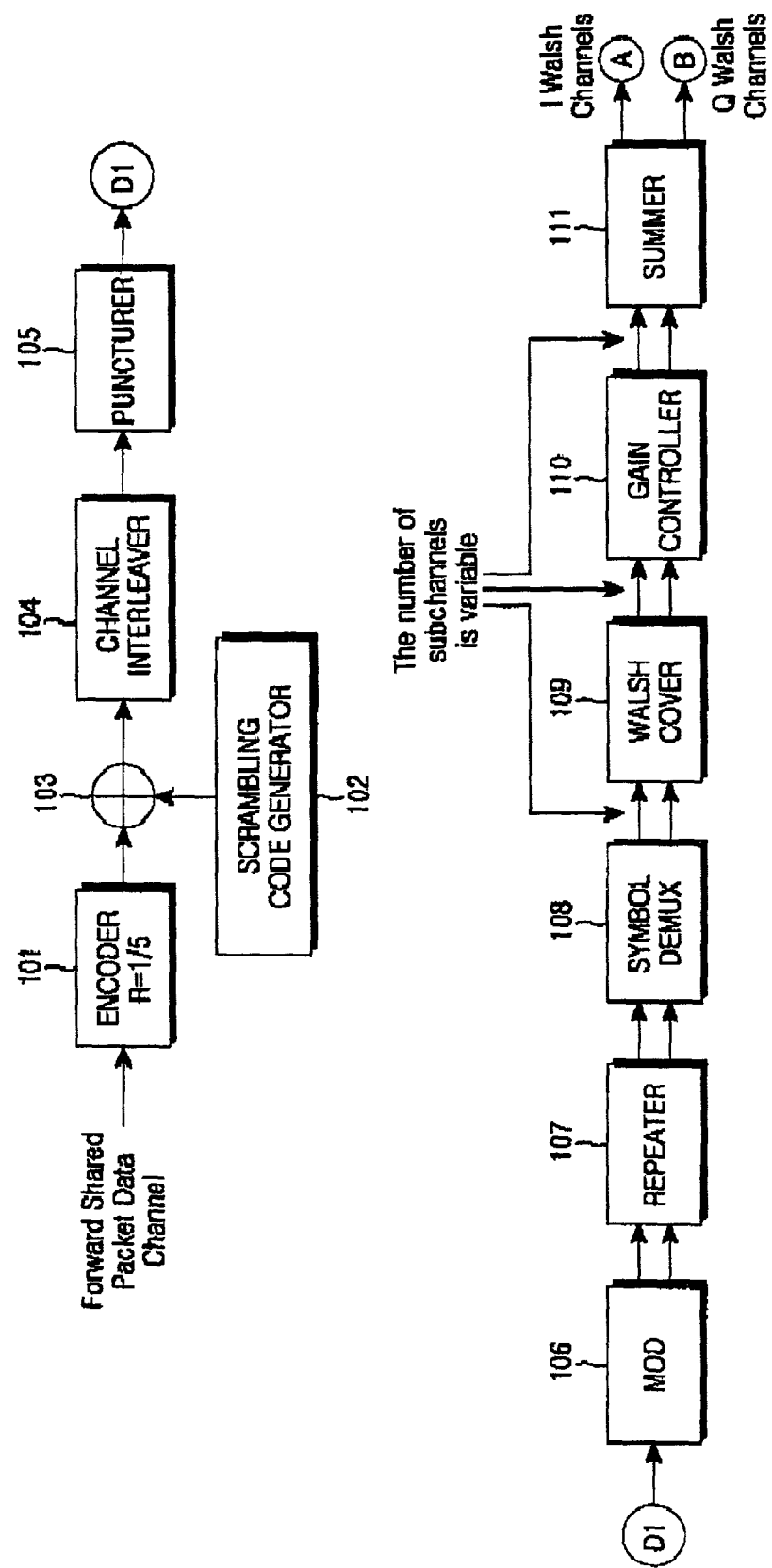
FIG. 1 illustrates a structure of a F-PDCH transmitter in a mobile communication system for high-speed packet transmission according to the prior art.

The present invention is directed to protecting the packet data from other users in a system where the packet data control information is open to the users, by replacing the scrambler (102 and 103) in the conventional PDCH transmitter of FIG. 1 with a novel scrambler according to the present invention. Further, the present invention reinforces the packet data protection function of a system having a scrambler for the packet data control channel.

In addition, the present invention applies a scrambler implemented to use a unique long code of the terminal, MAC ID, R-CQICH (Reverse Channel Quality Indicator Channel) and SSI (Serving Sector Indicator) to a PPDCCH transmitter and an SPDCCH transmitter, that transmit packet data control information. The proposed scrambler is applied either to both the PPDCCH transmitter and the SPDCCH transmitter or only to the SPDCCH transmitter according to the structure of the PPDCCH and the SPDCCH, and an operation of the terminal (or receiver). This is to prevent misoperation of the other terminals, which may occur when the scrambler is applied to both of the packet data control channels (PPDCCH and SPDCCH).

Figure 3:
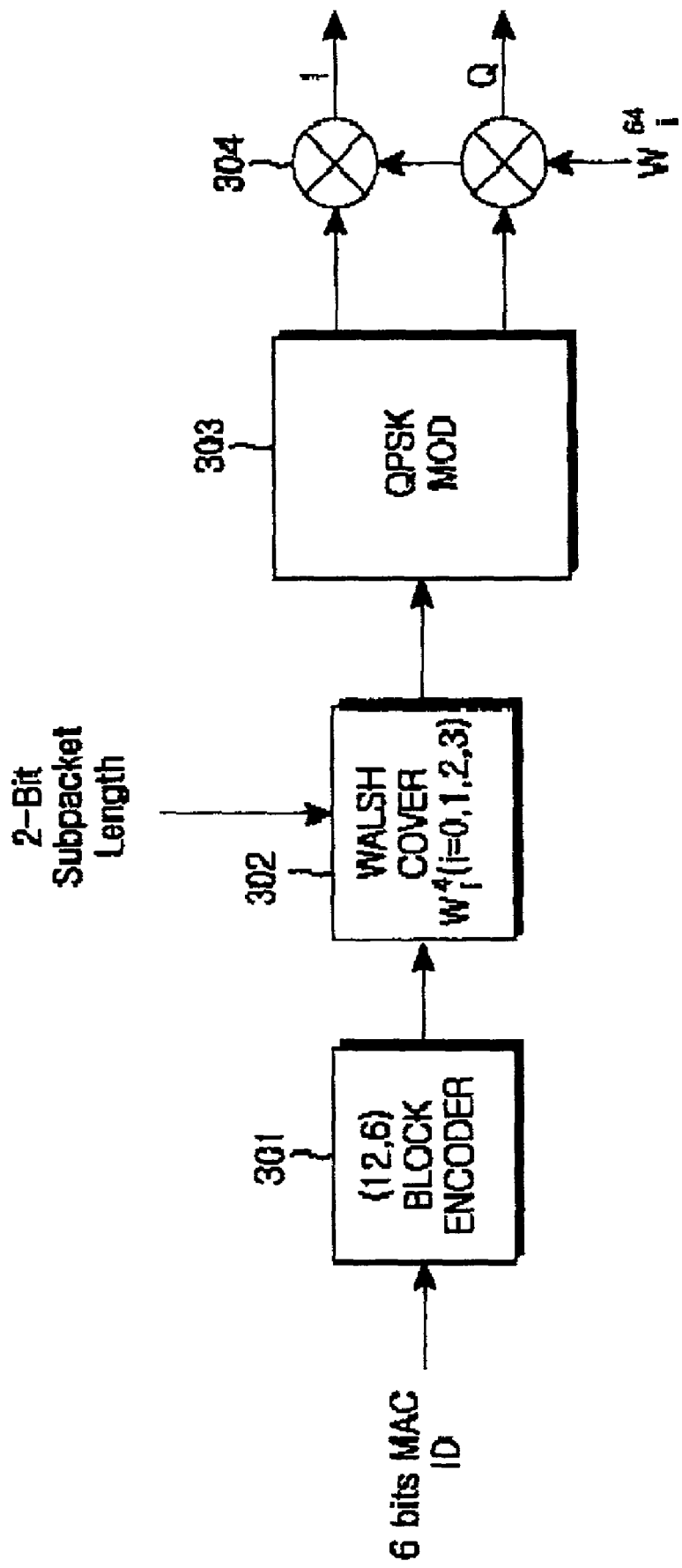
FIG. 3 illustrates a structure of an F-PPDCCH transmitter in a mobile communication system for high-speed packet transmission according to a first embodiment of the present invention.
Figure 4:
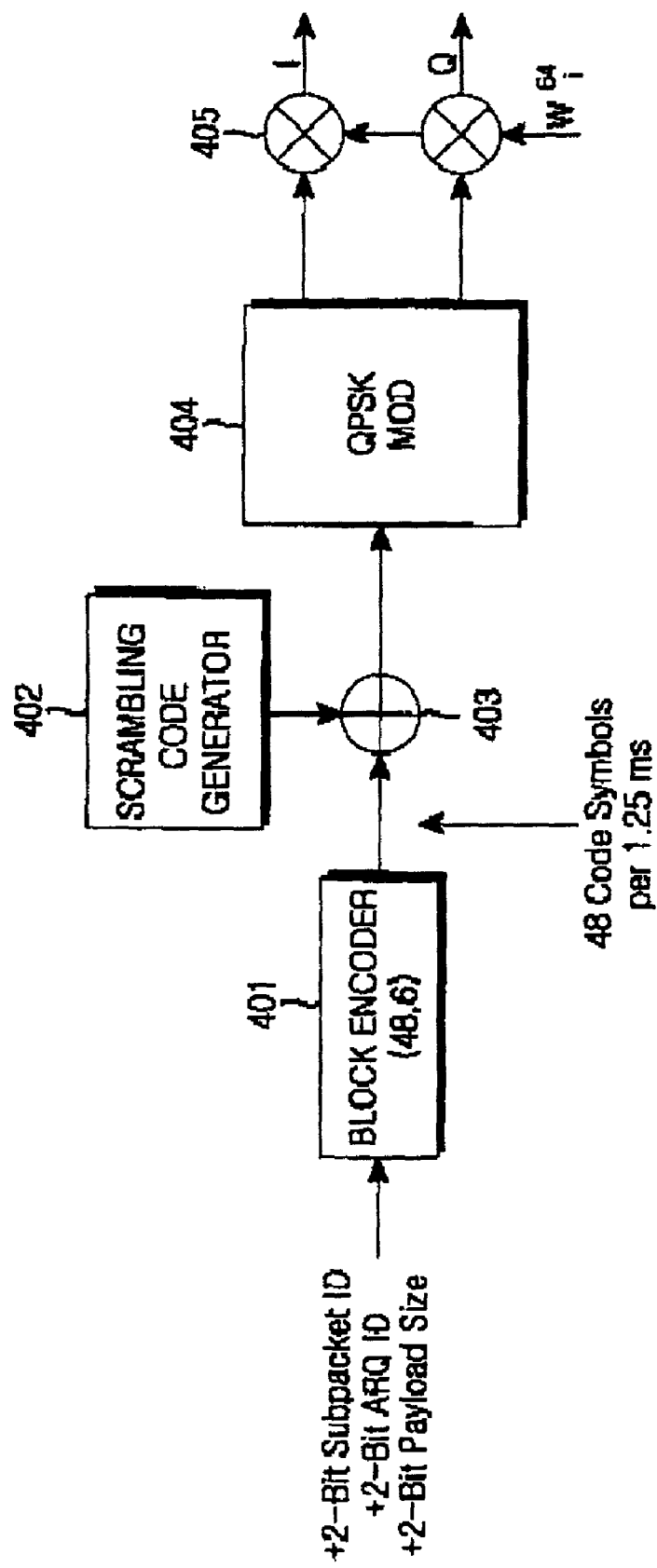
FIG. 4 illustrates a structure of an F-SPDCCH transmitter in a mobile communication system for high-speed packet transmission according to a first embodiment of the present invention.

For example, in a system having a packet data control channel (PDCCH) transmitter of FIGS. 3 and 4, all of the terminals determine whether the data transmitted over the packet data channel is their own data or another user's data, by analyzing the 6 bit MAC ID of the PPDCCH. Therefore, if the PPDCCH is scrambled, the other terminals may misrecognize the MAC ID, thus increasing a probability that the terminals will mistake other user's packet data for their own packet data. From this point of view, in a system FIG. 3 where a terminal determines whether the received data is its own data or another user's data by analyzing the 6-bit MAC ID, it is not preferable to scramble the channel over which the MAC ID is transmitted.

Figure 5:
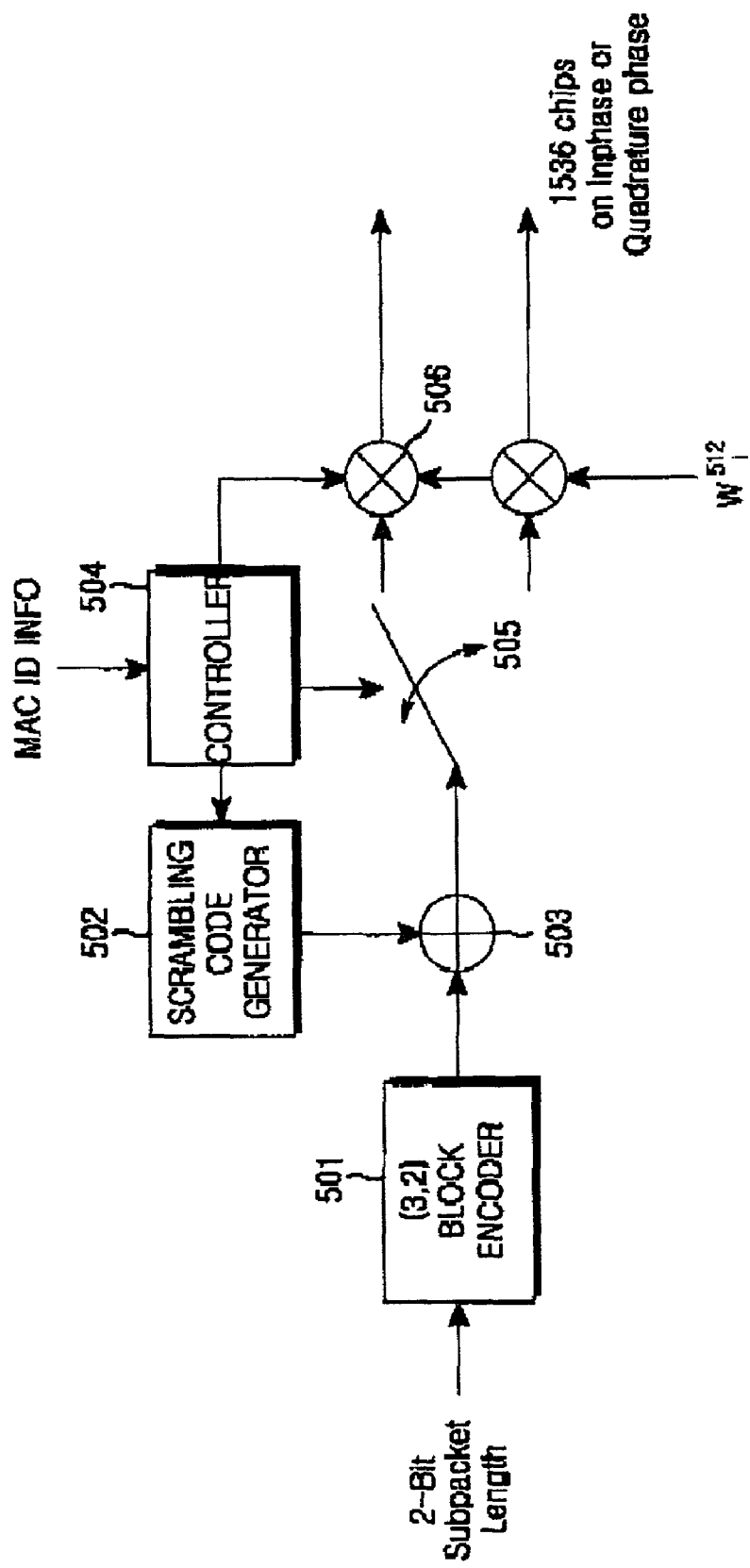
FIG. 5 illustrates a structure of an F-PPDCCH transmitter in a mobile communication system for high-speed packet transmission according to a second embodiment of the present invention.
Figure 6:
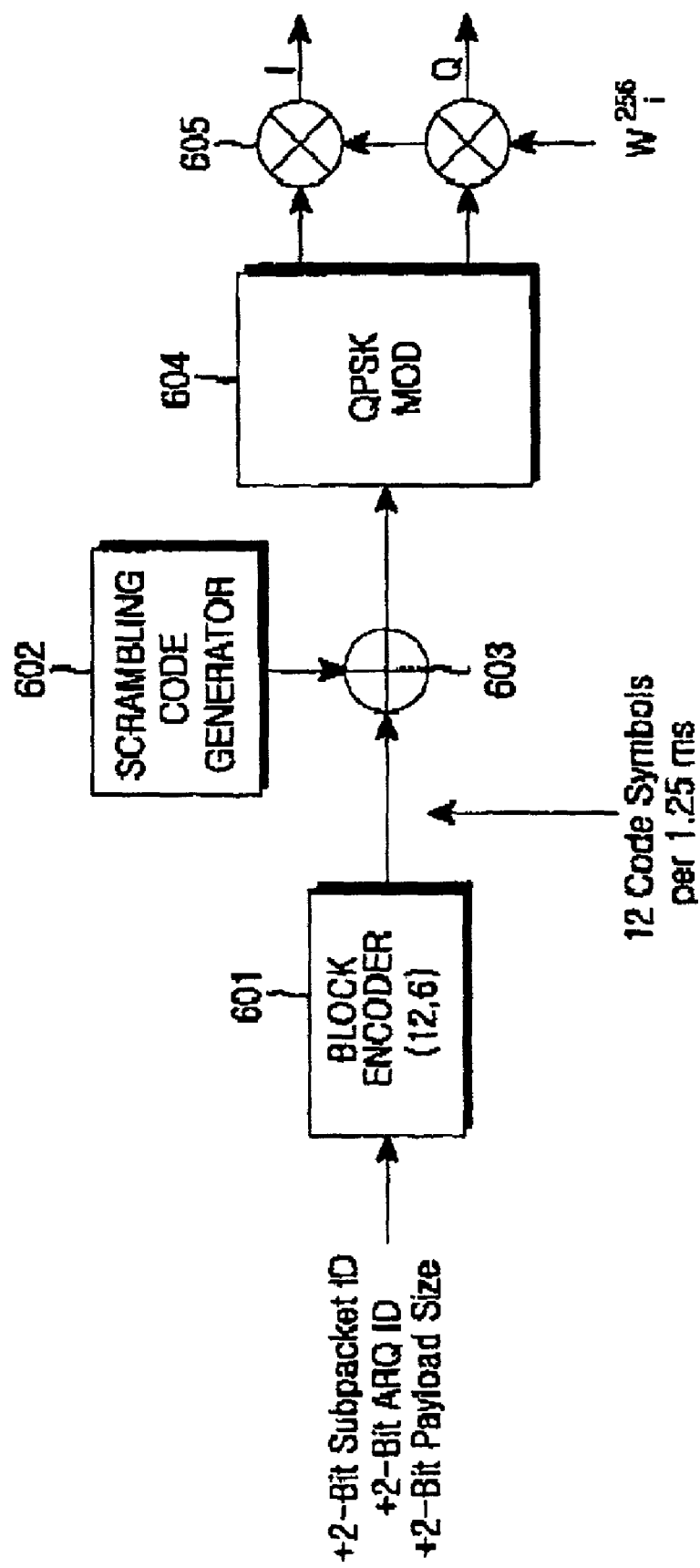
FIG. 6 illustrates a structure of an F-SPDCCH transmitter in a mobile communication system for high-speed packet transmission according to a second embodiment of the present invention.

On the other hand, in a system having a packet data control channel (PDCCH) transmitter of FIGS. 5 and 6, the terminal despreads the packet data control channel with a Walsh function uniquely assigned to the user according to the MAC ID instead of identifying the user by analyzing the 6-bit MAC ID, determines whether the received data is its own data by determining whether energy of the despread channel is greater than a threshold, and then demodulates the PPDCCH if the received data is its own data. Therefore, in the system having the PDCCH transmitter of FIGS. 5 and 6, it is possible to protect the user data by scrambling both of the packet data control channels.

Here, the R-CQICH is 5-bit information indicating reception energy of a forward common pilot transmitted from the terminal to the base station every 1.25 ms. This information, known to only the base station and the corresponding terminal, can be used in identifying the terminal. Further, the SSI indicates a sector number in a current active set. Since the users even in the same sector are assigned different numbers, this information can also be used as user identification information.

Figure 2:
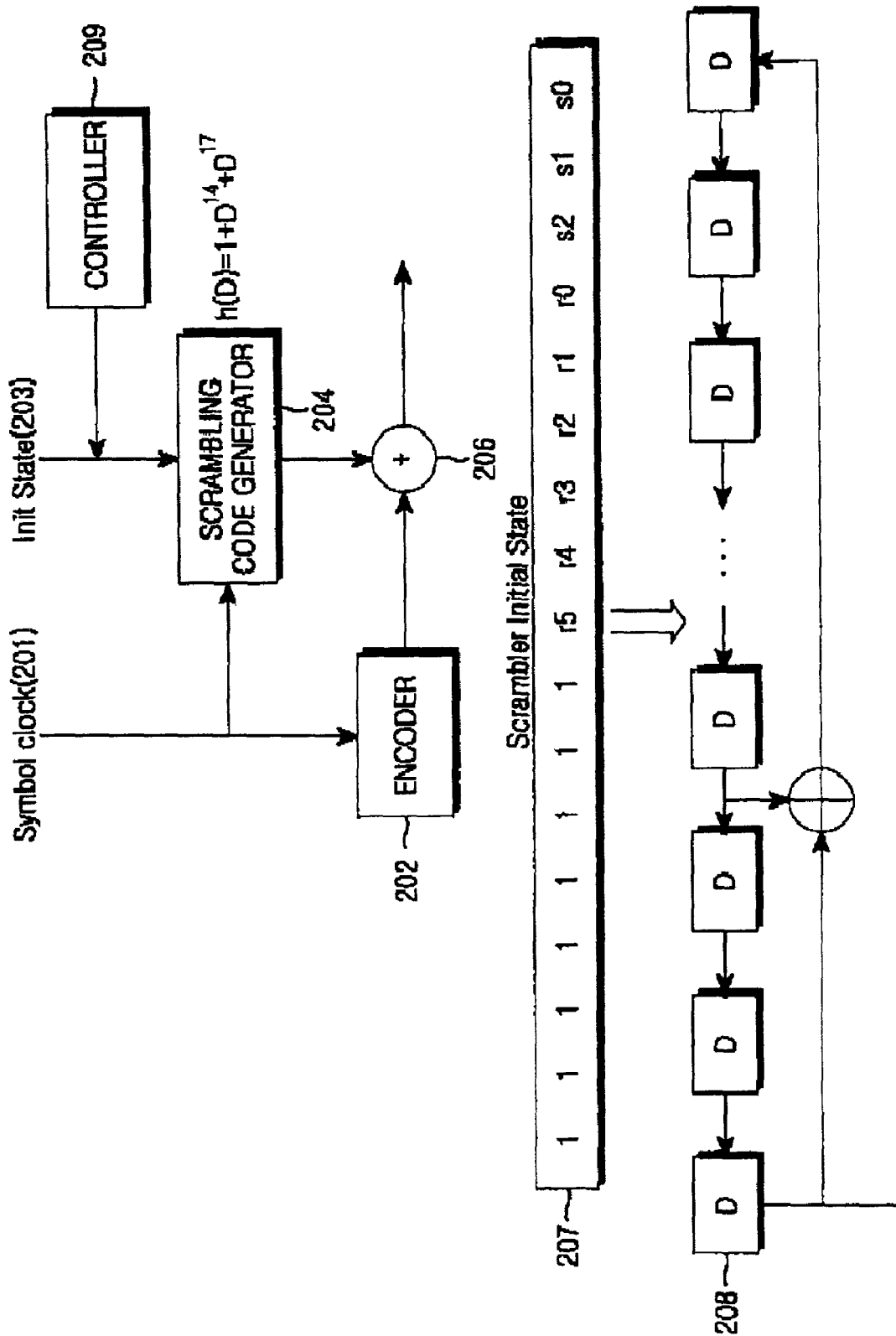
FIG. 2 illustrates a structure and operation of a scrambler according to an embodiment of the present invention.

FIG. 2 illustrates a detailed structure of a scrambling code generator according to an embodiment of the present invention. A structure and operation of the scrambling code generator according to an embodiment of the present invention will be described on the assumption that it is applied to the known packet data channel transmitter of FIG. 1. The scrambling code generator will operate in the same manner, even though it is applied to the PPDCCH or SPDCCH.

As illustrated, an encoder 202 and a scrambling code generator 204 operate in response to the same symbol clock. Here, the scrambling code generator 204 is comprised of a 17-tap linear feedback shift register 208, which sets an initial state value using information known to only the user that will receive packet data at an output start point of the encoder 202, and generates a scrambling code (or scrambling sequence) in response to the symbol clock. For example, the initial state value, as mentioned above, can be set by a combination of the 6-bit MAC ID, 3-bit SSI, 5-bit R-CQICH and some bits from a long code generator defined in the TIA/EIA/IS-2000 standard. That is, a controller 209 sets the initial state value using either all of the above information or some of the above information. In addition, either different initial state values or the same initial state value may be set for the PPDCCH, the SPDCCH and the PDCH. A rule of setting the initial state value is previously determined through a negotiation between the base station and the terminal, or is previously fixed during system design.

Reference numeral 207 illustrates an exemplary method of setting the initial state value. As illustrated, an initial state value of the shift register is set to [1 1 1 1 1 1 1 r5 r4 r3 r2 r1 r0 s2 s1 s0] at an output start point of the encoder 202, using the 6-bit MAC ID and the 3-bit SSI. Here, [r5 r4 r3 r2 r1 r0] represents the MAC ID assigned to the user, and [s2 s2 s0] represents the 3-bit SSI. The controller 209 determines the initial state value during each transmission of the packet data. The controller 209 sets the initial state value of the shift register by reading the 6-bit MAC ID and the 3-bit SSI of the corresponding terminal according to the destination of the packet data to be transmitted. The scrambling code generator 204 having the structure of the linear feedback shift register 208 shifts the values stored in register elements to the left every symbol clock, thus generating one scrambling bit every clock. Then, an XOR operator 206 performs scrambling by XORing an output of the encoder 202 and an output of the scrambling code generator 204. A long code generator defined in the TIA/EIA/IS-2000 can be used for the scrambling code generator 204, and the long code generator has the same scrambling code generating operation.

As described above, the present invention scrambles coded symbols of the packet data channel with a scrambling code generated using information (long code, MAC ID, R-CQICH and SSI) known only by the base station and the user determined (or scheduled) to receive the data, thus making it possible to protect the packet data on the packet data channel from the other users.

FIGS. 3 and 4 illustrate structures of a PPDCCH transmitter and an SPDCCH transmitter in a mobile communication system for high-speed packet transmission according to a first embodiment of the present invention, respectively. A brief description will be made of a receiving operation by a terminal in a system including the PDCCH transmitters of FIGS. 3 and 4.

First, a terminal desiring to receive a packet data service acquires subpacket length information by measuring energy by multiplying a signal received over the PPDCCH by 4 Walsh functions of length 4 for despreading, and then determining a Walsh function having the largest energy value among the 4 measured energy values. Further, the terminal acquires 6-bit MAC ID by performing (12,6) block decoding on the received coded symbols, and then determines whether the received packet data is its own data or another user's data by analyzing the MAC ID. If the received packet data is its own data, the terminal demodulates the SPDCCH.

After acquiring various control information of the packet data channel by demodulating the SPDCCH, the terminal demodulates the packet data channel (PDCH) using the acquired information. In the system acquiring the MAC ID information through decoding as in FIGS. 3 and 4, if the channel transmitting the MAC ID is subject to scrambling, there is a high probability that the other users will misrecognize the MAC ID. Therefore, it is preferable not to scramble the channel transmitting the MAC ID. Accordingly, the system according to an embodiment of the present invention scrambles only the SPDCCH.

FIG. 3 illustrates a structure of a PPDCCH transmitter in a mobile communication system for high-speed packet transmission according to a first embodiment of the present invention. The PPDCCH transmitter transmits MAC ID (user identification information) indicating a user determined to receive transmission packet data, and subpacket length information indicating a length of the transmission packet data.

Referring to FIG. 3, an encoder 301 encodes 6-bit MAC ID and outputs 12 coded symbols per slot. For example, a (12,6) block encoder for block encoding 6 input information bits and outputting 12 symbols is used for the encoder 301. A Walsh cover section 302 selects one of 4 Walsh codes of length 4 according to the subpacket length information indicating a length of the packet data, Walsh-covers the coded symbols from the encoder 301 with the selected Walsh code, and outputs 48 symbols. A QPSK modulator 303 QPSK-modulates the Walsh-covered symbols from the Walsh cover section 302, and outputs 24 modulated symbols through an I channel and the other 24 modulated symbols through a Q channel. A Walsh spreader 304 multiplies the modulated symbols from the QPSK modulator 303 by a Walsh function of length 64 assigned to the PPDCCH, for spreading, and outputs 1,536 chips.

FIG. 4 illustrates a structure of an SPDCCH transmitter in a mobile communication system for high-speed packet transmission according to a first embodiment of the present invention. The SPDCCH transmitter transmits the remaining control information except for the MAC ID and the subpacket length information. The remaining control information, as illustrated in FIG. 4, may include payload size information, ARQ channel ID information and subpacket ID information.

Referring to FIG. 4, an encoder 401 encodes a 6-bit information bit stream corresponding to the remaining control information and outputs 48 coded symbols. For example, a (48,6) block encoder for block encoding 6 input information bits and outputting 48 symbols is used for the encoder 401. A scrambling code generator 402, comprised of the 17-tap linear feedback shift register illustrated in FIG. 2, generates a scrambling sequence in the same operating principle as described above. Here, an initial state value of the shift register is set using unique information unknown to the other users. For example, the initial state value of the shift register is set by a combination of some or all of the unique terminal long code, MAC ID, R-CQICH and SSI. An XOR operator 403 XORs (or scrambles) the scrambling sequence generated by the scrambling code generator 402 and the coded symbols output from the encoder 401. A QPSK modulator 404 QPSK-modulates the scrambled coded symbols from the XOR operator 403, and outputs 24 modulated symbols through an I channel and the other 24 modulated symbols through a Q channel. A Walsh spreader 405 multiplies the modulated symbols from the QPSK modulator 404 by a Walsh function of length 64 assigned to the SPDCCH, for spreading, and outputs 1,536 chips.

As described above, the first embodiment of the present invention is featured by scrambling coded symbols of the SPDCCH.

FIGS. 5 and 6 illustrate structures of a PPDCCH transmitter and an SPDCCH transmitter in a mobile communication system for high-speed packet transmission according to a second embodiment of the present invention, respectively. A brief description will be made of a receiving operation by a terminal in a system including the PDCCH transmitters of FIGS. 5 and 6.

First, a terminal desiring to receive a packet data service acquires packet data control information by measuring energy by despreading a signal on the PPDCCH with a Walsh function of length 512 uniquely assigned to the user during initial setup of the packet data service. If the measured energy value is larger than a threshold, the terminal demodulates the PPDCCH and SPDCCH received, considering that the received packet is its own data. However, if the measured energy value is less than the threshold, the terminal suspends the receiving operation, considering that the received packet is other user's packet data. In the system where the terminal determines whether the received data is its own data by despreading the packet data control channel using a Walsh function uniquely assigned to a specific user and then measuring energy of the despread symbols as illustrated in FIGS. 5 and 6, application of the scrambler to both of the packet data control channels (PPDCCH and SPDCCH) does not interfere with a receiving operation of the other terminals. Therefore, the second embodiment of the present invention protects packet data control information from other users by scrambling both of the packet data control channels, and further protects the packet data channel.

FIG. 5 illustrates a structure of a PPDCCH transmitter in a mobile communication system for high-speed packet transmission according to a second embodiment of the present invention. The PPDCCH transmitter transmits MAC ID indicating a user determined to receive transmission packet data, and subpacket length information indicating a length of the transmission packet data.

Referring to FIG. 5, an encoder 501 encodes 2-bit subpacket length information and outputs 3 coded symbols. For example, a (3,2) block encoder for block encoding 2 input information bits and outputting 3 symbols is used for the encoder 501. A scrambling code generator 502, comprised of the 17-tap linear feedback shift register illustrated in FIG. 2, generates a scrambling sequence in the same operating principle as described above. Here, an initial state value of the shift register is set using unique information unknown to the other users by a controller 504. For example, the initial state value of the shift register is set by a combination of some or all of the unique terminal long code, MAC ID, R-CQICH and SSI. An XOR operator 503 XORs the scrambling sequence generated by the scrambling code generator 502 and the coded symbols output from the encoder 501. The controller 504 controls a switch 505 and a Walsh spreader 506 according to the MAC ID assigned to the user determined to receive the packet data. The second embodiment of the present invention determines a complex channel (I channel or Q channel) for transmitting the PPDCCH and the Walsh function according to the MAC ID. Therefore, the base station includes a mapping table for storing a mapping relation among the MAC IDs, the complex channels and the Walsh functions, and controls the switch 505 and the Walsh spreader 506 by reading a complex channel and a Walsh function corresponding to the MAC ID from the mapping table. The switch 505, under the control of the controller 504, switches the scrambled symbols from the XOR operator 503 to the I channel or the Q channel. The Walsh spreader 506, under the control of the controller 504, spreads the symbols received through the switch 505 with a corresponding Walsh function of length 512, and outputs 1,536 chips.

FIG. 6 illustrates a structure of an SPDCCH transmitter in a mobile communication system for high-speed packet transmission according to a second embodiment of the present invention. The SPDCCH transmitter transmits the remaining control information except for the MAC ID and the subpacket length information. The remaining control information, as illustrated in FIG. 6, may include payload size information, ARQ channel ID information and subpacket ID information.

Referring to FIG. 6, an encoder 601 encodes a 6-bit information bit stream corresponding to the remaining control information and outputs 12 coded symbols. For example, a (12,6) block encoder for block encoding 6 input information bits and outputting 12 symbols is used for the encoder 601. A scrambling code generator 602, comprised of the 17-tap linear feedback shift register illustrated in FIG. 2, generates a scrambling sequence in the same operating principle as described above. Here, an initial state value of the shift register is set using unique information unknown to the other users by the controller 504. For example, the initial state value of the shift register is set by a combination of some or all of the unique terminal long code, MAC ID, R-CQICH and SSI. An XOR operator 603 XORs the scrambling sequence generated by the scrambling code generator 602 and the coded symbols output from the encoder 601. A QPSK modulator 604 QPSK-modulates the scrambled coded symbols from the XOR operator 603, and outputs 6 modulated symbols through an I channel and the other 6 modulated symbols through a Q channel. A Walsh spreader 605 multiplies the modulated symbols from the QPSK modulator 604 by a Walsh function of length 256 assigned to the SPDCCH, for spreading, and outputs 1,536 chips.

As described above, the second embodiment of the present invention is featured by scrambling coded symbols of both the PPDCCH and the SPDCCH.

Next, reference will be made to a structure of receivers corresponding to the above-stated transmitters.

Figure 7:
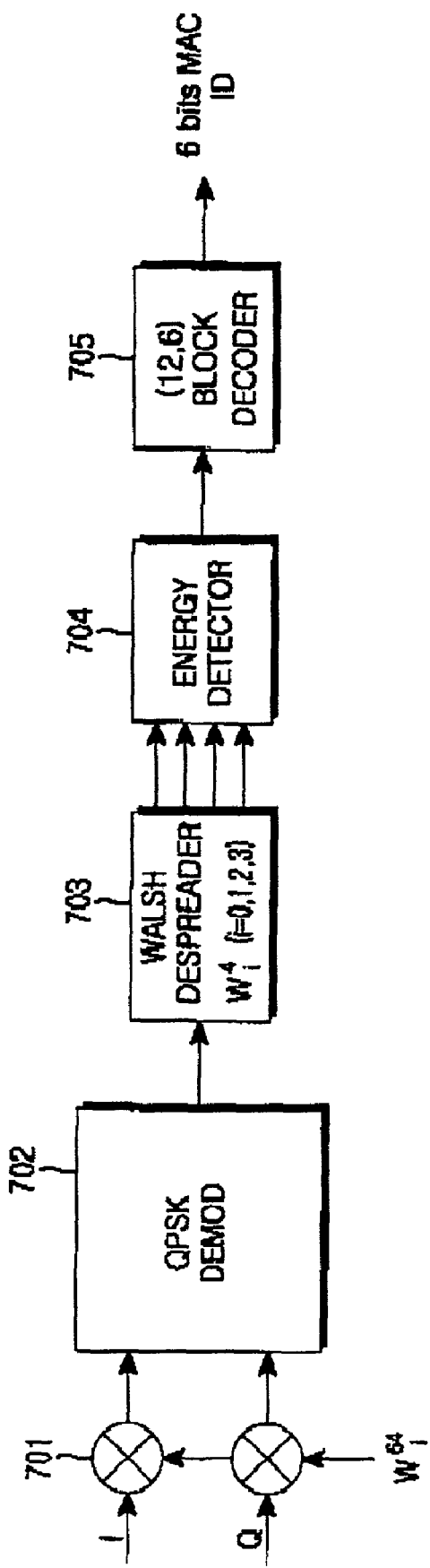
FIG. 7 illustrates a structure of an F-PPDCCH receiver in a mobile communication system for high-speed packet transmission according to a first embodiment of the present invention.

FIG. 7 illustrates a structure of a PPDCCH receiver in a mobile communication system for high-speed packet transmission according to a first embodiment of the present invention. The receiver of FIG. 7 has a structure corresponding to that of the transmitter of FIG. 3.

Referring to FIG. 7, a Walsh despreader 701 despreads a received signal with the Walsh function used by the PPDCCH transmitter, and outputs 24 symbols through an I channel and the other 24 symbols through a Q channel. A QPSK demodulator 702 QPSK-demodulates the 48 symbols from the Walsh despreader 701 and outputs 48 demodulated symbols. A Walsh despreader 703 despreads the 48 demodulated symbols from the QPSK demodulator 702 with 4 Walsh functions of length 4, and outputs four 12-symbol sets. An energy detector 704 detects energy of each of the four 12-symbol sets from the Walsh despreader 703, and acquires subpacket length information from a Walsh function corresponding to the 12-symbol set having the largest energy value. Like the transmitter, the receiver includes a mapping table for storing a mapping relation between the subpacket lengths and the Walsh functions, and acquires the subpacket length information by detecting the Walsh function used by the transmitter. Further, the energy detector 704 provides the 12-symbol set having the largest energy value to a decoder 705. The decoder 705 decodes the 12 symbols from the energy detector 704 and outputs 6-bit MAC ID. Then, a controller (not shown) determines whether the received data is its own data or other user's data by analyzing the 6-bit MAC ID, and controls the receiver to demodulate the SPDCCH if the received data is its own data.

Figure 8:
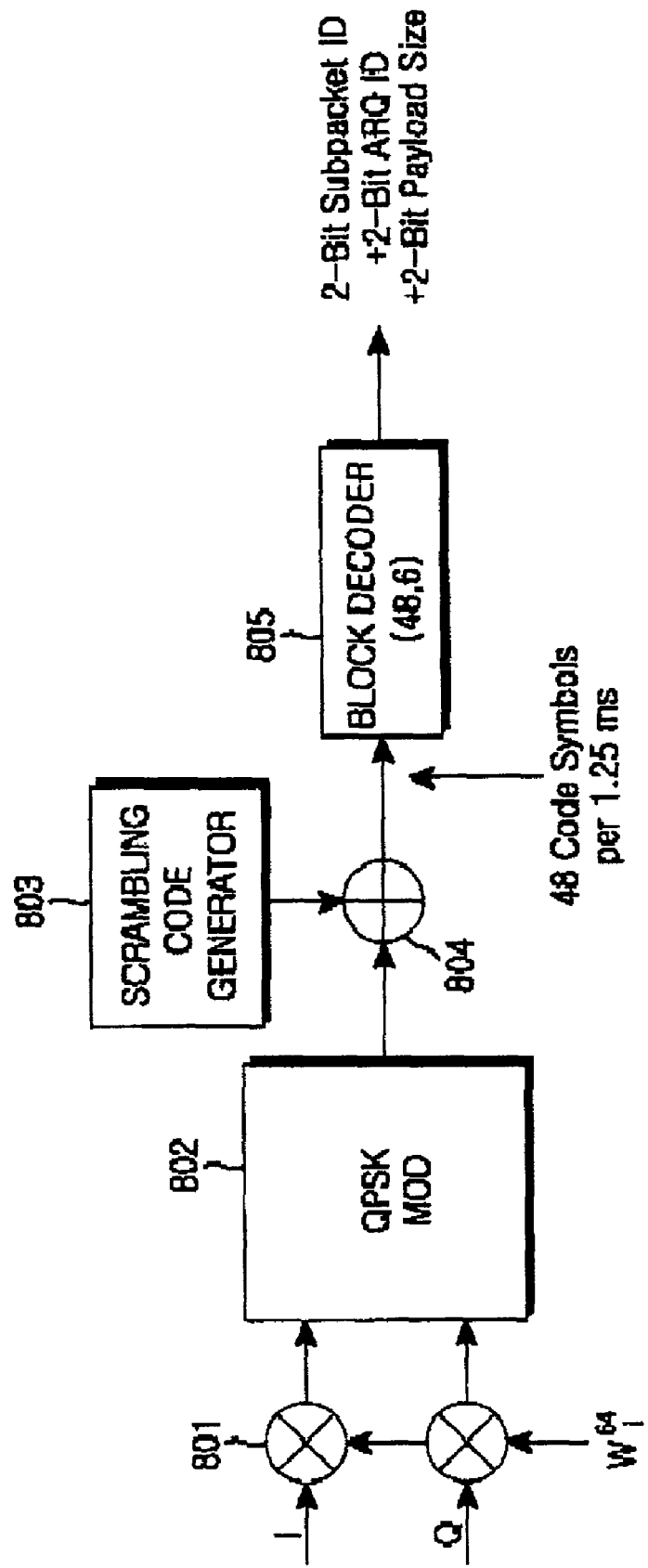
FIG. 8 illustrates a structure of an F-SPDCCH receiver in a mobile communication system for high-speed packet transmission according to a first embodiment of the present invention.

FIG. 8 illustrates a structure of an SPDCCH receiver in a mobile communication system for high-speed packet transmission according to a first embodiment of the present invention. The receiver of FIG. 8 has a structure corresponding to that of the transmitter of FIG. 4.

Referring to FIG. 8, a Walsh despreader 801 despreads a received signal with the Walsh function of length 64 used for channel spreading by the SPDCCH transmitter, and outputs 24 symbols through an I channel and the other 24 symbols through a Q channel. A QPSK demodulator 802 QPSK-demodulates the 48 symbols from the Walsh despreader 801 and outputs 48 demodulated symbols. A scrambling code generator 803 is identical to the scrambling code generator used by the SPDCCH transmitter of FIG. 4. An XOR operator 804 XORs (or descrambles) the scrambling sequence output from the scrambling code generator 803 and the symbols output from the QPSK demodulator 802, and outputs 48 symbols. A decoder 805 performs (48,6) block decoding on the 48 descrambled symbols from the XOR operator 804 and outputs 6-bit control information. As stated above, the control information may include the 2-bit subpacket ID (SPID), the 2-bit ARQ channel ID and the 2-bit payload size information. The control information is used later in receiving the packet data channel (PDCH).

Figure 9:
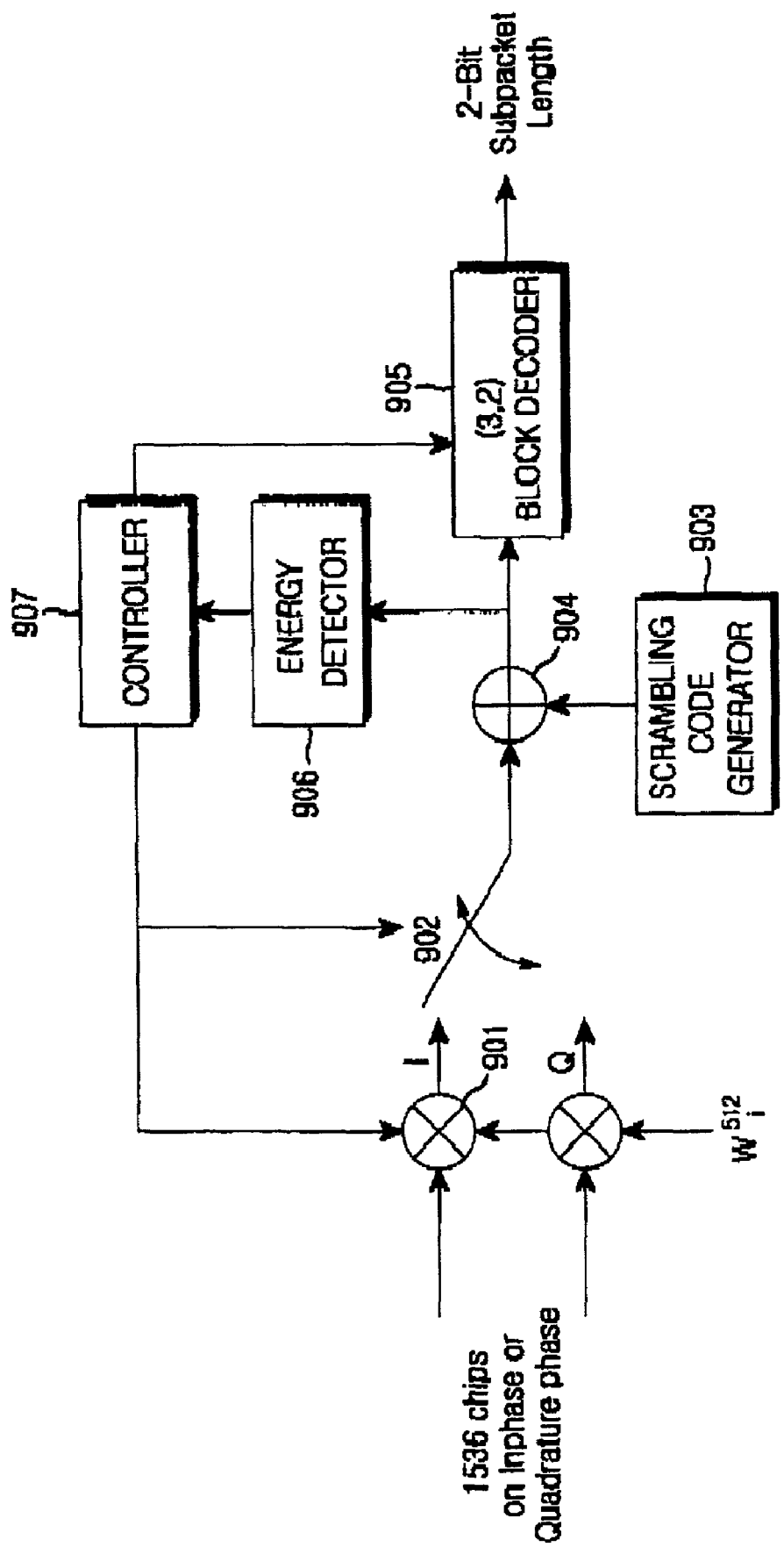
FIG. 9 illustrates a structure of an F-PPDCCH receiver in a mobile communication system for high-speed packet transmission according to a second embodiment of the present invention.

FIG. 9 illustrates a structure of a PPDCCH receiver in a mobile communication system for high-speed packet transmission according to a second embodiment of the present invention. The receiver of FIG. 9 has a structure corresponding to that of the transmitter of FIG. 5.

Referring to FIG. 9, a controller 907 controls a Walsh despreader 901 and a switch 902 based on a mapping table in which a mapping relation among the MAC IDs, the complex channels and the Walsh functions is stored. That is, the controller 907 provides the Walsh despreader 901 with a Walsh function associated with MAC ID assigned from the base station, and controls a switching operation of the switch 902 to receive a signal on the complex channel (I channel or Q channel) according to the MAC ID. Further, the controller 907 determines whether to enable a decoder 905 according to a detected energy value of an energy detector 906. That is, if the detected energy value is greater than a threshold, the controller 907 enables the decoder 905. Otherwise, if the detected energy value is less than the threshold, the controller 907 disables the decoder 905.

The Walsh despreader 901 despreads a received signal with the Walsh function provided from the controller 907, and outputs 3 symbols per slot. The switch 902, under the control of the controller 907, selects one of the I and Q channel signals output from the Walsh despreader 901, and provides the selected channel signal to an XOR operator 904. A scrambling code generator 903 is identical to the scrambling code generator used by the PPDCCH transmitter of FIG. 5. The XOR operator 904 XORs (or descrambles) the despread symbols received through the switch 902 and the scrambling sequence output from the scrambling code generator 903. The energy detector 906 measures energy of the descrambled symbols from the XOR operator 904 and provides the measured energy value to the controller 907. The controller 907 then compares the measured energy value with a threshold. If the measured energy value is greater than the threshold, the controller 907 performs the next operation, determining that the received data is its own data. If, however, the measured energy value is less than the threshold, the controller 907 suspends the receiving operation, determining that the received data is not its own data. The decoder 905, under the control of the controller 907, performs (3,2) block decoding on the descrambled symbols from the descrambler 904, and outputs 2-bit subpacket length information. The subpacket length information is used later in receiving the SPDCCH and the packet data channel (PDCH).

Figure 10:
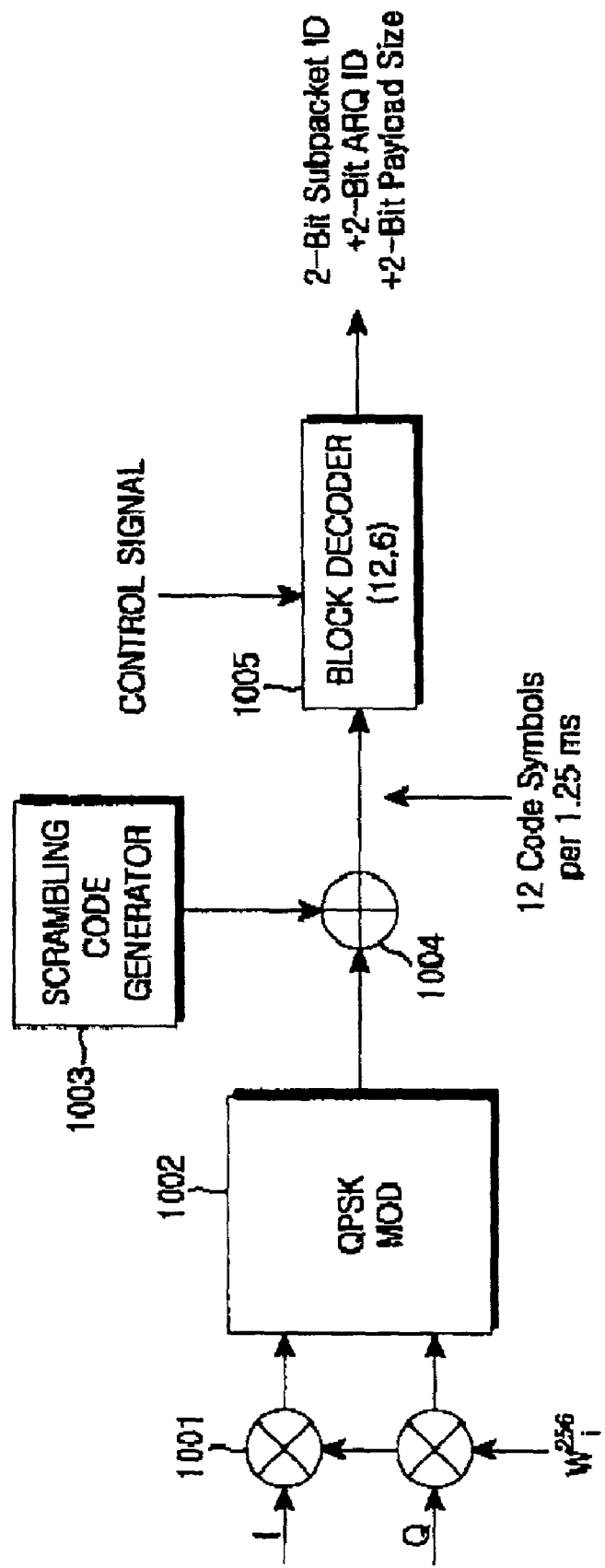
FIG. 10 illustrates a structure of an F-SPDCCH receiver in a mobile communication system for high-speed packet transmission according to a second embodiment of the present invention.

FIG. 10 illustrates a structure of an SPDCCH receiver in a mobile communication system for high-speed packet transmission according to a second embodiment of the present invention. The receiver of FIG. 10 has a structure corresponding to that of the transmitter of FIG. 6.

The receiver illustrated in FIG. 10 is controlled by the controller 907 to operate only when the reception energy detected by the energy detector 906 of FIG. 9 is greater than a threshold. Since the PPDCCH and the SPDCCH are simultaneously received, the receiver should store data on the SPDCCH until the controller 907 determines whether to receive the SPDCCH based on the measured energy value after measuring reception energy of the PPDCCH. For example, the receiver may temporarily store the 1,536-chip data before despreading, and then despread the chip data according to the decision by the controller 907. Alternatively, the receiver may temporarily store the QPSK-demodulated symbols, and then descramble the QPSK-demodulated symbols according to the decision by the controller 907. The extent of the receiving operation on the SPDCCH and the type of the data to be temporarily stored are optional.

Referring to FIG. 10, a Walsh despreader 1001 despreads a received signal with the Walsh function of length 256 used by the SPDCCH transmitter, and outputs 6 symbols per slot. A QPSK demodulator 1002 QPSK-demodulates the 6 symbols from the Walsh despreader 1001 and outputs 12 demodulated symbols. A scrambling code generator 1003 is identical to the scrambling code generator 602 used by the SPDCCH transmitter of FIG. 6. An XOR operator 1004 XORs (or descrambles) the scrambling sequence output from the scrambling code generator 1003 and the symbols output from the QPSK demodulator 1002. A decoder 1005 performs (12, 6) block decoding on the descrambled symbols from the XOR operator 1004 and outputs 6-bit control information. As stated above, the control information may include the 2-bit subpacket ID (SPID), the 2-bit ARQ channel ID and the 2-bit payload size information. The control information is used later in receiving the packet data channel (PDCH).

As described above, the mobile communication system for high-speed packet transmission according to the present invention scrambles the packet data channel using information, which is not transmitted over the packet data control channel and known to only the base station and a specific user, thereby making it possible to protect user data on the packet data channel. In addition, the mobile communication system scrambles the packet data control channel so that other users cannot demodulate the control information for forward packet data, making it difficult to demodulate the forward packet data, thus contributing to protection of the user data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station for transmitting control information needed for demodulation of a packet data channel over a packet data control channel to a terminal, comprising:
an encoder for encoding the control information;
a scrambler for generating a scrambling sequence using unique information known only to the terminal and the base station and scrambling the coded control information with the scrambling sequence if the control information does not include Medium Access Control IDentification (MAC ID) information; and
a modulator for modulating the scrambled control information output from the scrambler,
wherein the unique information is not transmitted for the use of generating the scrambling sequence by the terminal over the packet data control channel, and
wherein the scrambler generates the scrambling sequence on a basis of an initial state determined using at least two of the MAC ID, SSI (Serving Sector Indicator) information, R-CQICH (Reverse-Channel Quality Indicator Channel) information, and long code information.

2. The base station of claim 1, further comprising:
a Walsh spreader for spreading the modulated control information output from the modulator with a predetermined Walsh function.

3. The base station apparatus of claim 1, wherein the control information is transmitted without scrambling if the control information includes the MAC ID information.

4. The base station apparatus of claim 1, wherein the scrambler scrambles the packet data channel with the scrambling sequence.

5. A terminal for receiving control information needed for demodulation of a packet data channel over a packet data control channel from a base station, comprising:
a demodulator for demodulating the control information;
a descrambler for generating a scrambling sequence using unique information known only to the terminal and the base station and descrambling the control information with the scrambling sequence if the control information does not include Medium Access Control IDentification (MAC ID) information; and
a decoder for decoding the descrambled control information,
wherein the unique information is not transmitted for the use of generating the scrambling sequence by the terminal over the packet data control channel, and
wherein the descrambler generates the scrambling sequence on a basis of an initial state determined using at least two of the MAC ID information, Serving Sector Indicator (SSI) information, Reverse-Channel Quality Indicator Channel (R-CQICH) information and long code information.

6. The terminal of claim 5, further comprising:
a Walsh despreader for despreading the received control information output from the base station with a Walsh code.

7. The terminal of claim 5, wherein the control information is transmitted without scrambling by the base station if the control information includes the MAC ID information.

8. The terminal of claim 5, wherein the descrambler descrambles the packet data channel with the scrambling sequence.

9. A method for transmitting control information needed for demodulation of a packet data channel over a packet data control channel to a terminal in a base station, comprising the steps of:
encoding the control information;
generating a scrambling sequence using unique information known only to the terminal and the base station;
scrambling the coded control information with the scrambling sequence if the control information does not include Medium Access Control IDentification (MAC ID) information;
modulating the scrambled control information,
wherein the unique information is not transmitted for the use of generating the scrambling sequence by the terminal over the packet data control channel, and
wherein the scrambling sequence is generated on a basis of an initial state determined using at least two of the MAC ID information, Serving Sector Indicator (SSI) information, Reverse-Channel Quality Indicator Channel (R-CQICH) information and long code information.

10. The method of claim 9, further comprising the steps of:
spreading the modulated control information with a predetermined Walsh function.

11. The method of claim 9, wherein the control information is transmitted without scrambling if the control information includes the MAC ID information.

12. The method of claim 9, wherein the packet data channel is scrambled with the scrambling sequence.

13. A method for receiving control information needed for demodulation of a packet data channel over a packet data control channel transmitted from a base station in a terminal, comprising:
demodulating the control information;
generating a scrambling sequence using unique information known to only the terminal and the base station and descrambling the control information with the scrambling sequence if the control information transmitted does not include Medium Access Control IDentification (MAC ID) information; and
decoding the descrambled control information,
wherein the unique information is not transmitted for the use of generating the scrambling sequence by the terminal over the packet data control channel, and wherein the scrambling sequence is generated on a basis of an initial state determined using at least two of the MAC ID information, Serving Sector Indicator (SSI) information, Reverse-Channel Quality Indicator Channel (R-CQICH) information and long code information.

14. The method of claim 13, further comprising:
despreading the received control information with a Walsh code.

15. The method of claim 13, wherein the control information is transmitted without scrambling by the base station if the control information includes the MAC ID information.

16. The method of claim 13, wherein the packet data channel is descrambled with the scrambling sequence.

* * * * *